US009104546B2

(12) United States Patent
Wang et al.

(10) Patent No.: US 9,104,546 B2
(45) Date of Patent: Aug. 11, 2015

(54) METHOD FOR PERFORMING BLOCK MANAGEMENT USING DYNAMIC THRESHOLD, AND ASSOCIATED MEMORY DEVICE AND CONTROLLER THEREOF

(75) Inventors: Chi-Lung Wang, Hsinchu County (TW); Chia-Hsin Chen, Tai-Chung (TW); Chien-Cheng Lin, Yilan County (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 606 days.

(21) Appl. No.: 13/014,735

(22) Filed: Jan. 27, 2011

(65) Prior Publication Data

US 2011/0289260 A1    Nov. 24, 2011

Related U.S. Application Data

(60) Provisional application No. 61/347,500, filed on May 24, 2010.

(51) Int. Cl.
*G06F 13/12*    (2006.01)
*G06F 12/02*    (2006.01)

(52) U.S. Cl.
CPC .... *G06F 12/0246* (2013.01); *G06F 2212/7201* (2013.01)

(58) Field of Classification Search
CPC .................................................. G06F 12/0246
USPC ......................................................... 711/103
See application file for complete search history.

(56) References Cited

U.S. PATENT DOCUMENTS

| 8,397,014 B2* | 3/2013 | Khmelnitsky et al. | 711/103 |
| 8,713,066 B1* | 4/2014 | Lo et al. | 707/800 |
| 2003/0225961 A1* | 12/2003 | Chow et al. | 711/103 |
| 2007/0033325 A1* | 2/2007 | Sinclair | 711/103 |
| 2007/0033376 A1* | 2/2007 | Sinclair et al. | 711/203 |
| 2007/0174579 A1* | 7/2007 | Shin | 711/170 |

(Continued)

FOREIGN PATENT DOCUMENTS

| CN | 101256534 A | 9/2008 |
| CN | 101339808 A | 1/2009 |

OTHER PUBLICATIONS

Strasser et al. (U.S. Appl. No. 61/298,861).*

(Continued)

*Primary Examiner* — Aimee Li
*Assistant Examiner* — Trang Ta
(74) *Attorney, Agent, or Firm* — Winston Hsu; Scott Margo (57) ABSTRACT

A method for performing block management is provided. The method is applied to a controller of a Flash memory, where the Flash memory includes a plurality of blocks. The method includes: adjusting a dynamic threshold according to at least one condition; and comparing a valid/invalid page count of a specific block of the plurality of blocks with the dynamic threshold to determine whether to erase the specific block. An associated memory device and a controller thereof are also provided, where the memory device includes the Flash memory and the controller. In particular, the controller includes a read only memory (ROM) arranged to store a program code, and further includes a microprocessor arranged to execute the program code to control access to the Flash memory and manage the plurality of blocks, where under control of the microprocessor, the controller operates according to the method.

20 Claims, 5 Drawing Sheets

(56) References Cited

U.S. PATENT DOCUMENTS

| | | | |
|---|---|---|---|
| 2007/0268754 A1* | 11/2007 | Lee et al. | 365/185.29 |
| 2008/0147998 A1* | 6/2008 | Jeong | 711/161 |
| 2008/0235432 A1* | 9/2008 | Chen et al. | 711/100 |
| 2009/0172308 A1* | 7/2009 | Prins et al. | 711/154 |
| 2009/0271562 A1* | 10/2009 | Sinclair | 711/103 |
| 2010/0037009 A1* | 2/2010 | Yano et al. | 711/103 |
| 2010/0077136 A1* | 3/2010 | Ware et al. | 711/103 |
| 2010/0115188 A1* | 5/2010 | Lee et al. | 711/103 |
| 2010/0174851 A1* | 7/2010 | Leibowitz et al. | 711/103 |
| 2010/0332923 A1* | 12/2010 | D'Abreu et al. | 714/708 |
| 2011/0022778 A1* | 1/2011 | Schibilla et al. | 711/103 |
| 2011/0055458 A1* | 3/2011 | Kuehne | 711/103 |

OTHER PUBLICATIONS

"Impact of UBIFS Wear-leveling on System I/O Performance", Han et al, Computing Engineering, vol. 35, No. 6, p. 260-p. 262, PROC, Mar. 2009.

\* cited by examiner

METHOD FOR PERFORMING BLOCK MANAGEMENT USING DYNAMIC THRESHOLD, AND ASSOCIATED MEMORY DEVICE AND CONTROLLER THEREOF

CROSS REFERENCE TO RELATED APPLICATIONS

This application claims the benefit of U.S. provisional application No. 61/347,500, which was filed on May 24, 2010 and entitled "FLASH STORAGE DEVICE AND OPERATION METHOD THEREOF" and is incorporated herein by reference.

BACKGROUND OF THE INVENTION

1. Field of the Invention

The present invention relates to access to a Flash memory, and more particularly, to a method for performing block management, and to an associated memory device and a controller thereof.

2. Description of the Prior Art

As technologies of Flash memories progress in recent years, many kinds of portable memory devices (e.g. memory cards respectively complying with SD/MMC, CF, MS, and XD standards) or solid state drives (SSDs) equipped with Flash memories are widely implemented in various applications. Therefore, the control of access to Flash memories in these memory devices has become an important issue.

Taking NAND Flash memories as an example, they can mainly be divided into two types, i.e. Single Level Cell (SLC) Flash memories and Multiple Level Cell (MLC) Flash memories. Each transistor that is considered a memory cell in SLC Flash memories only has two charge levels that respectively represent a logical value 0 and a logical value 1. In addition, the storage capability of each transistor that is considered a memory cell in MLC Flash memories can be fully utilized. More specifically, the voltage for driving memory cells in the MLC Flash memories is typically higher than that in the SLC Flash memories, and different voltage levels can be applied to the memory cells in the MLC Flash memories in order to record information of at least two bits (e.g. binary values 00, 01, 11, or 10) in a transistor that is considered a memory cell. Theoretically, the storage density of the MLC Flash memories may reach twice the storage density of the SLC Flash memories, which is considered good news for NAND Flash memory manufacturers who encountered a bottleneck of NAND Flash technologies.

As MLC Flash memories are cheaper than SLC Flash memories, and are capable of providing higher capacity than SLC Flash memories while the space is limited, MLC Flash memories have been a main stream for implementation of most portable memory devices on the market. However, various problems of the MLC Flash memories have arisen due to their unstable characteristics. In order to ensure that the access control of a memory device over the Flash memory therein can comply with related standards, the controller of the Flash memory should have some handling mechanisms in order to properly handle its data access operations.

According to the related art, the memory device having the aforementioned handling mechanisms may still suffer from some deficiencies. For example, in a situation where the memory device is designed to have higher storage capacity and/or higher flexibility, the handling mechanisms may become very complicated, which may cause an increased chip area of hardware resources and associated costs. Therefore, a novel method is required for performing block management in order to enhance the performance of memory devices equipped with Flash memories.

SUMMARY OF THE INVENTION

It is therefore an objective of the claimed invention to provide a method for performing block management, and to provide an associated memory device and a controller thereof, in order to solve the above-mentioned problems.

It is another objective of the claimed invention to provide a method for performing block management, and to provide an associated memory device and a controller thereof, in order to enhance the performance of the memory device and control the memory device to operate in an adaptive manner.

According to a preferred embodiment of the claimed invention, a method for performing block management is provided. The method is applied to a controller of a Flash memory, where the Flash memory comprises a plurality of blocks. The method comprises: adjusting a dynamic threshold according to at least one condition; and comparing a valid/invalid page count of a specific block of the plurality of blocks with the dynamic threshold to determine whether to erase the specific block.

While the method mentioned above is disclosed, an associated memory device is further provided. The memory device comprises a Flash memory comprising a plurality of blocks, and further comprises a controller arranged to access the Flash memory and manage the plurality of blocks. In addition, the controller adjusts a dynamic threshold according to at least one condition. Additionally, the controller compares a valid/invalid page count of a specific block of the plurality of blocks with the dynamic threshold to determine whether to erase the specific block.

While the method mentioned above is disclosed, a controller of a memory device is further provided, wherein the controller is utilized for accessing a Flash memory comprising a plurality of blocks. The controller comprises: a read only memory (ROM) arranged to store a program code; and a microprocessor arranged to execute the program code to control access to the Flash memory and manage the plurality of blocks, wherein under control of the microprocessor, the controller adjusts a dynamic threshold according to at least one condition, and compares a valid/invalid page count of a specific block of the plurality of blocks with the dynamic threshold to determine whether to erase the specific block.

It is an advantage of the present invention that, by adjusting the dynamic threshold, the present invention can properly perform block management, in order to enhance the performance of the memory device. As a result of adjusting the dynamic threshold, the memory device can operate in an adaptive manner.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
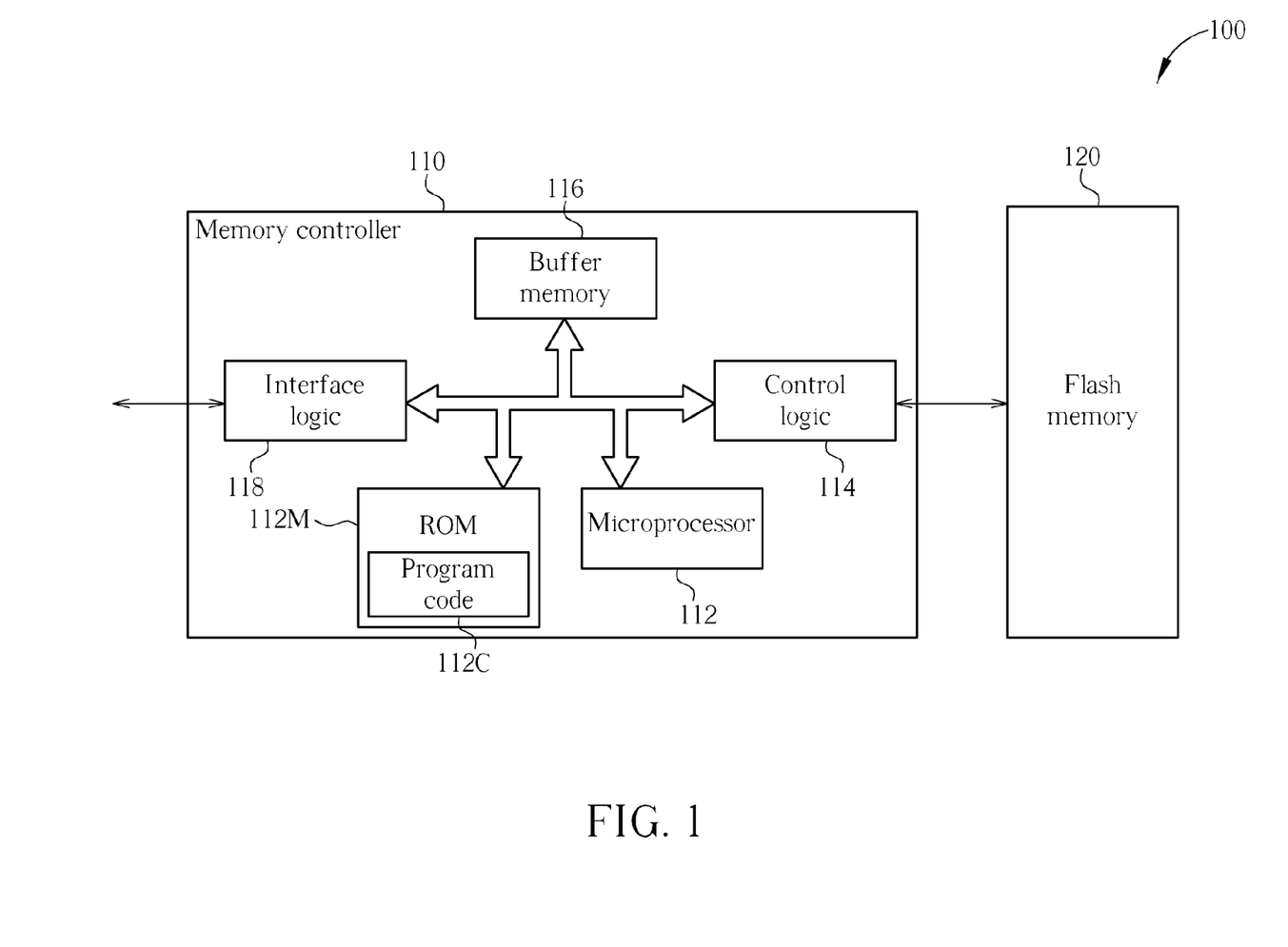
FIG. 1 is a diagram of a memory device according to a first embodiment of the present invention.

Please refer to FIG. 1, which illustrates a diagram of a memory device 100 according to a first embodiment of the present invention. In particular, the memory device 100 of this embodiment is a portable memory device, examples of which may include, but not limited to, memory cards complying with SD/MMC, CF, MS, or XD standards, and Universal Serial Bus (USB) Flash drives (which can be referred to as USB Flash disks). The memory device 100 comprises a Flash memory 120, and further comprises a controller arranged to access the Flash memory 120, where the aforementioned controller of this embodiment is a memory controller 110. According to this embodiment, the memory controller 110 comprises a microprocessor 112, a read only memory (ROM) 112M, a control logic 114, a buffer memory 116, and an interface logic 118. Please note that the portable memory device is taken as an example of the memory device 100 in this embodiment. This is for illustrative purposes only, and is not meant to be a limitation of the present invention. According to a variation of this embodiment, the memory device 100 can be a solid state drive (SSD).

In this embodiment, the ROM 112M is arranged to store a program code 112C, and the microprocessor 112 is arranged to execute the program code 112C to control the access to the Flash memory 120. Typically, the Flash memory 120 comprises a plurality of blocks, and when the controller (e.g. the memory controller 110 that executes the program code 112C by utilizing the microprocessor 112) performs data erasure operations on the Flash memory 120, the minimum erasure unit is a block. For example, in this embodiment or some variations thereof, the controller can perform data erasure operations on the Flash memory 120 by erasing in units of blocks and/or in units of meta-blocks, where each meta-block may include a predetermined number of blocks. In addition, a block can comprise a specific amount of pages (and more specifically, physical pages), and when the controller mentioned above performs data writing operations on the Flash memory 120, the minimum writing unit is a page. For example, the controller can perform data writing operations on the Flash memory 120 by writing/programming in units of pages and/or in units of a number of pages, where a physical page may comprise a plurality of sectors, such as 8 sectors.

In practice, the memory controller 110 that executes the program code 112C by utilizing the microprocessor 112 is capable of performing various control operations by utilizing the internal components within the memory controller 110. For example, the memory controller 110 utilizes the control logic 114 to control access to the Flash memory 120 (e.g. operations of accessing at least one block or at least one page), utilizes the buffer memory 116 to perform buffering operations for the memory controller 110, and utilizes the interface logic 118 to communicate with a host device (not shown in FIG. 1). The memory controller 110 may control the flash memory 120 according to accessing commands issued by the host device. According to this embodiment, in addition to accessing the Flash memory 120, the memory controller 110 is capable of properly managing the plurality of blocks. Please refer to FIG. 2 for related details of block management performed by the memory controller 110.

Figure 2:
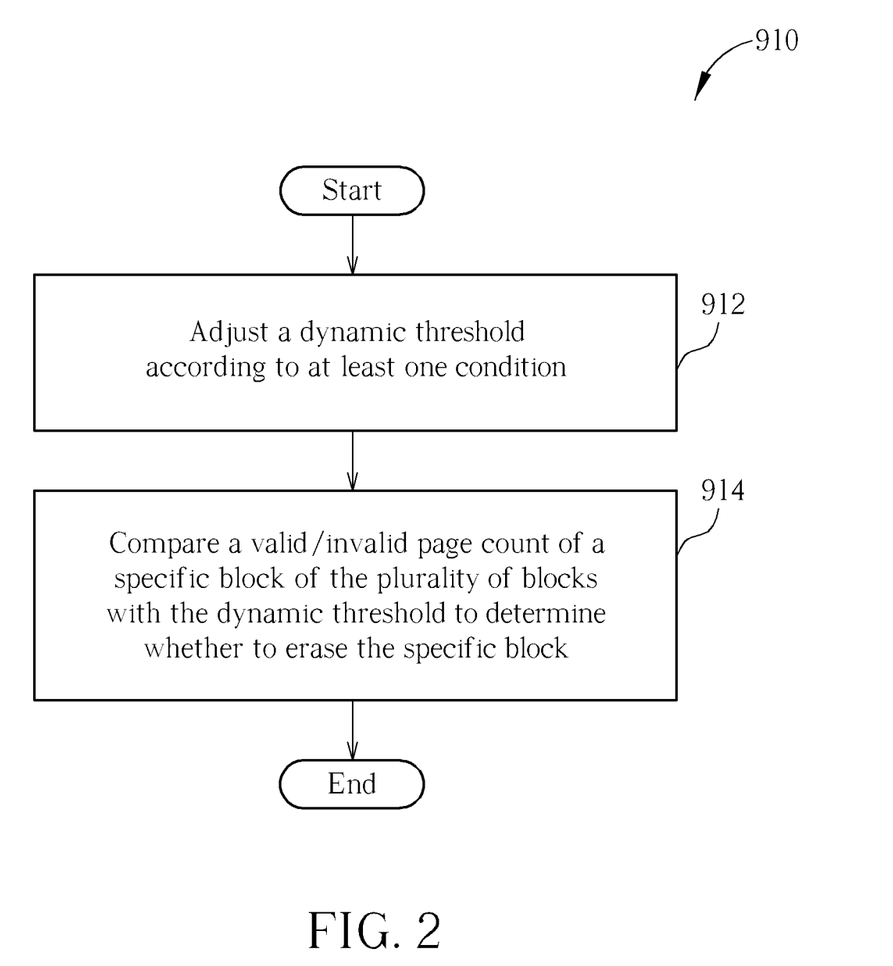
FIG. 2 is a flowchart of a method for performing block management according to an embodiment of the present invention.

FIG. 2 is a flowchart of a method 910 for performing block management according to an embodiment of the present invention. The method can be applied to the memory device 100 shown in FIG. 1, and more particularly, to the controller mentioned above (e.g. the memory controller 110 that executes the program code 112C by utilizing the microprocessor 112). In addition, the method can be implemented by utilizing the memory device 100 shown in FIG. 1, and more particularly, by utilizing the controller mentioned above. The method 910 is described as follows.

In Step 912, the controller adjusts a dynamic threshold DT according to at least one condition (e.g. one or more conditions). More particularly, the dynamic threshold DT is an adjustable threshold that can be utilized for determining whether to erase one of the blocks. For example, the controller can adjust the dynamic threshold DT according to the number of blank/used blocks within the plurality of blocks. This is for illustrative purposes only, and is not meant to be a limitation of the present invention. According to a variation of this embodiment, the controller can adjust the dynamic threshold DT according to the ratio of the number of the blank/used blocks to the number of the plurality of blocks.

In Step 914, the controller compares a valid/invalid page count of a specific block of the plurality of blocks with the dynamic threshold DT to determine whether to erase the specific block. The valid/invalid page count represents the number of valid/invalid pages of the specific block, where a valid page represents a physical page that stores useful data (or valid data), while an invalid page represents a physical page that does not store useful data. In practice, as each fully programmed block comprises a predetermined number of pages (e.g. 128 pages in some embodiments), the valid page count and the invalid page count of the same fully programmed block are complementary to each other.

Please note that the controller such as the memory controller 110 can read the valid/invalid page count from a valid/invalid page count table within the memory device 100, where the valid/invalid page count table is utilized for storing respective valid/invalid page counts of the plurality of blocks. For example, the memory controller 110 can store the valid/invalid page count table in the Flash memory 120. When needed, the memory controller 110 loads at least one portion (e.g. a portion or all) of the valid/invalid page count table from the Flash memory 120, and temporarily stores the aforementioned at least one portion of the valid/invalid page count table in the buffer memory 116, in order to update the valid/invalid page count table. Afterward, the memory controller 110 can further store the updated version of the valid/invalid page count table in the Flash memory 120.

The memory controller 110 can adjust the dynamic threshold DT according to a detected value $D_V$ regarding the memory controller 110 and/or the Flash memory 120. For example, the detected value $D_V$ may include, but not limited to, the aforementioned number of blank/used blocks within the plurality of blocks, and the aforementioned ratio of the number of the blank/used blocks to a number of the plurality of blocks. More particularly, the memory controller 110 can adjust the dynamic threshold DT according to whether the detected value $D_V$ falls within a specific range (or value) of a plurality of ranges R(k), where k=0, 1, ..., or K, and K can be a positive integer. Thus, the plurality of ranges comprises (K+1) ranges R(0), R(1), ..., and R(K). Regarding the adjustment performed in Step 912, the adjustment amounts of different ranges, such as a portion or all of the (K+1) ranges R(0), R(1), ..., and R(K), can be regarded as a function of the detected value $D_V$, and therefore can be collectively referred to as the adjustment amount $DT_A(D_V)$. Similarly, the dynamic threshold DT of different ranges, such as a portion or all of the (K+1) ranges R(0), R(1), ..., and R(K), can be regarded as a function of the detected value $D_V$, and therefore can be collectively referred to as the dynamic threshold $DT(D_V)$. For example, in a situation where the specific range represents a range $R(k_1)$ of the (K+1) ranges R(0), R(1), ..., and R(K) and the adjustment amount $\{DT_A(D_V)|D_V \in R(k_1)\}$ corresponding to the range $R(k_1)$ is positive, and more particularly, is a positive value, the memory controller 110 increases the dynamic threshold DT. In another example, in a situation where the specific range represents a range $R(k_2)$ of the (K+1) ranges $R(0), R(1), \ldots,$ and $R(K)$ and the adjustment amount $\{DT_A(D_V)|D_V \in R(k_2)\}$ corresponding to the range $R(k_2)$ is negative, and more particularly, is a negative value, the memory controller 110 decreases the dynamic threshold DT. In another example, in a situation where the specific range represents a range $R(k_3)$ of the (K+1) ranges $R(0), R(1), \ldots,$ and $R(K)$ and the adjustment amount $\{DT_A(D_V)|D_V \in R(k_3)\}$ corresponding to the range $R(k_3)$ is zero, the memory controller 110 applies the zero adjustment amount $\{DT_A(D_V)|D_V \in R(k_3)\}$ to the dynamic threshold DT, and therefore, adjusts the dynamic threshold DT with nothing.

According to a variation of the above embodiment, the memory controller 110 can adjust the dynamic threshold DT according to a busy/idle level of the memory controller 110, and therefore, the detected value $D_V$ can be the busy/idle level of the memory controller 110. For example, when the busy/idle level indicates that the memory controller 110 is busy (e.g. the busy/idle level such as a busy level reaches a predetermined level), the memory controller 110 can adjust the dynamic threshold DT to decrease the occurrence probability of an erasure operation, so that the workload may be reduced. Thus, in Step 914, the memory controller 110 is more likely to determine not to erase the specific block. In another example, when the busy/idle level indicates that the memory controller 110 is not busy (e.g. the busy/idle level such as a busy level is less than a predetermined level), the memory controller 110 can adjust the dynamic threshold DT to increase the occurrence probability of an erasure operation, so that the hardware resources thereof may be fully utilized. Thus, in Step 914, the controller is more likely to determine to erase the specific block.

According to some embodiments of the present invention, such as a portion or all of the above embodiments/variations, the memory controller 110 can perform an erasure operation immediately in order to guarantee the overall performance. For example, in a situation where the aforementioned valid/invalid page count represents a valid page count, the memory controller 110 immediately erases the specific block when it is detected that the valid page count of the specific block is equal to zero. In another example, in a situation where the aforementioned valid/invalid page count represents an invalid page count, the memory controller 110 immediately erases the specific block when it is detected that the invalid page count of the specific block reaches the maximum value available (e.g. the number of pages of a fully programmed block).

According to some embodiments of the present invention, such as a portion or all of the above embodiments/variations, the aforementioned at least one condition comprises a condition of whether an event occurs. Thus, when being triggered by the event, the memory controller 110 can adjust the dynamic threshold DT.

Figure 3A:
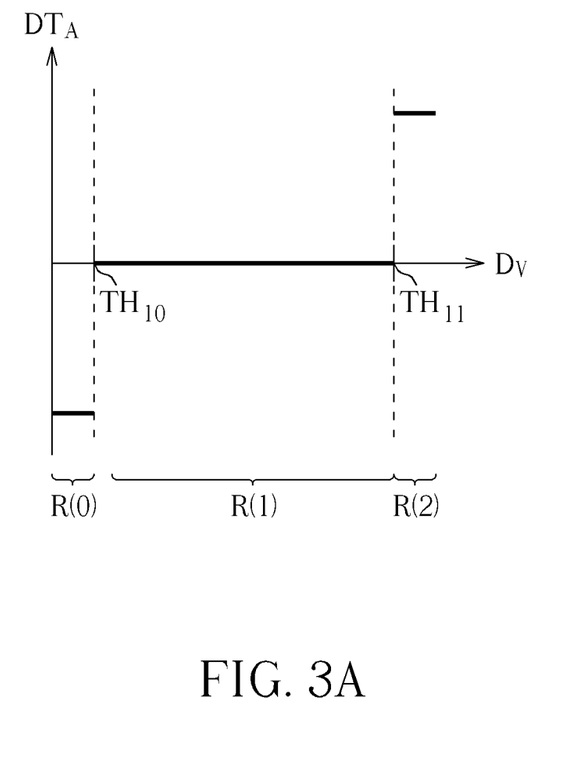
FIGS. 3A-3C illustrate some implementation details of the method shown in FIG. 2 according to some embodiments of the present invention.
Figure 3B:
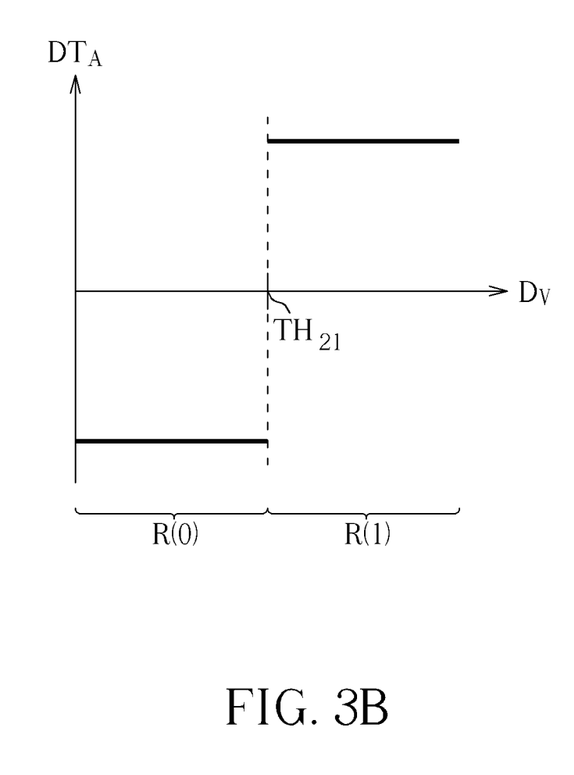
Figure 3C:
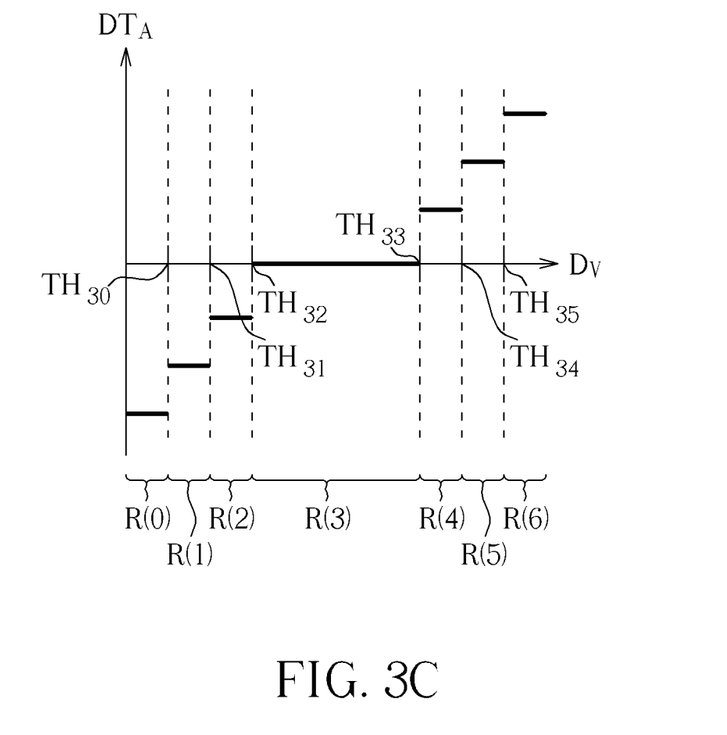

FIGS. 3A-3C illustrate some implementation details of the method shown in FIG. 2 according to some embodiments of the present invention. In these embodiments the aforementioned at least one condition may comprise one or more conditions for determining the adjustment amount $DT_A(D_V)$ and/or determining whether to adjust the dynamic threshold DT.

Referring to FIG. 3A, in a situation where K=2, the (K+1) ranges mentioned above comprises three ranges $R(0), R(1),$ and $R(2)$. The adjustment amount $DT_A(D_V)$ is illustrated with some curves of a function (labeled "$DT_A$" in FIG. 3A), and more particularly, the bold lines shown in FIG. 3A. In this embodiment, the aforementioned at least one condition comprises a first condition of whether the detected value $D_V$ reaches a predetermined threshold such as the predetermined threshold $TH_{11}$, and further comprises a second condition of whether the detected value $D_V$ is below another predetermined threshold such as the predetermined threshold $TH_{10}$, where at least a portion (e.g. a portion or all) of the first condition and the second condition can be inspected by the memory controller 110 in Step 912. As a result of applying this function to the operation of Step 912, the memory controller 110 increases the dynamic threshold DT when the detected value $D_V$ reaches the predetermined threshold $TH_{11}$, or decreases the dynamic threshold DT when the detected value $D_V$ is below the predetermined threshold $TH_{10}$. In particular, the detected value $D_V$ of this embodiment can be the number of the blank blocks within the plurality of blocks.

Referring to FIG. 3B, in a situation where K=1, the (K+1) ranges mentioned above comprises two ranges $R(0)$ and $R(1)$. The adjustment amount $DT_A(D_V)$ is illustrated with some curves of a function (labeled "$DT_A$" in FIG. 3B), and more particularly, the bold lines shown in FIG. 3B. In this embodiment, the aforementioned at least one condition comprises the first condition of whether the detected value $D_V$ reaches a predetermined threshold, such as the predetermined threshold $TH_{21}$, where the first condition is inspected by the memory controller 110 in Step 912. As a result of applying this function to the operation of Step 912, the memory controller 110 increases the dynamic threshold DT when the detected value $D_V$ reaches the predetermined threshold $TH_{21}$, or decreases the dynamic threshold DT when the detected value $D_V$ does not reach the predetermined threshold $TH_{21}$. In particular, the detected value $D_V$ of this embodiment can be the number of the blank blocks within the plurality of blocks.

Referring to FIG. 3C, in a situation where K=6, the (K+1) ranges mentioned above comprises seven ranges $R(0), R(1), \ldots,$ and $R(6)$. The adjustment amount $DT_A(D_V)$ is illustrated with some curves of a function (labeled "$DT_A$" in FIG. 3C), and more particularly, the bold lines shown in FIG. 3C. In this embodiment, the aforementioned at least one condition comprises a plurality of conditions, such as some combinations/variations of the first condition and the second condition. As the predetermined thresholds $TH_{30}, TH_{31}, TH_{32}, TH_{33}, TH_{34},$ and $TH_{35}$ shown in FIG. 3C respectively defines the ranges $R(0), R(1), R(2), R(3), R(4), R(5),$ and $R(6)$, the predetermined thresholds $TH_{30}, TH_{31}, TH_{32}, TH_{33}, TH_{34},$ and $TH_{35}$ can be utilized for determining whether the detected value $D_V$ falls within any of the ranges $R(0), R(1), \ldots,$ and $R(6)$. Similarly, at least a portion (e.g. a portion or all) of the plurality of conditions can be inspected by the memory controller 110 in Step 912. As a result of applying this function to the operation of Step 912, the memory controller 110 increases the dynamic threshold DT when the detected value $D_V$ reaches any of the predetermined thresholds $TH_{33}, TH_{34},$ and $TH_{35}$, or decreases the dynamic threshold DT when the detected value $D_V$ is below any of the predetermined thresholds $TH_{32}, TH_{31},$ and $TH_{30}$. More specifically, in a situation where the specific range represents a range $R(k_4)$ of the ranges $R(0), R(1), \ldots,$ and $R(6)$, the memory controller 110 applies the adjustment amount $\{DT_A(D_V)|D_V \in R(k_4)\}$ corresponding to the range $R(k_4)$ to the dynamic threshold DT, and therefore, adjusts the dynamic threshold DT with the adjustment amount $\{DT_A(D_V)|D_V \in R(k_4)\}$. In particular, the detected value $D_V$ of this embodiment can be the number of the blank blocks within the plurality of blocks.

It is an advantage of the present invention that, by properly designing a function for adjusting the dynamic threshold DT, such as any of those disclosed in the embodiments shown in FIGS. 3A-3C, the present invention can properly perform block management, in order to enhance the performance of the memory device. As a result of adjusting the dynamic threshold, the memory device can operate in an adaptive manner. For example, while the memory device is just used and has lots of blank blocks, the dynamic threshold can be determined as a high value. Hence, the occurrence probability of an erasure operation can be reduced, and the endurance of the memory device can be improved. In another example, while the memory device is used for a long time and has a few blank blocks, the dynamic threshold can be determined as a low value. Hence, the occurrence probability of an erasure operation can be increased, and the memory device can provide more blank blocks for storing data sent from the host device. In addition, implementing according to any of the respective embodiments/variations disclosed above will not cause unreasonable additional costs, and even can save costs in contrast to the related art. Therefore, by implementing based upon one or more of the embodiments/variations disclosed above, the related art problems can be resolved without greatly increasing the overall costs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing block management, the method being applied to a controller of a Flash memory, the Flash memory comprising a plurality of blocks, the method comprising:
   adjusting a dynamic threshold according to at least one condition; and
   comparing a valid or invalid page count of a specific block of the plurality of blocks with the dynamic threshold to determine whether to erase the specific block.

2. The method of claim 1, wherein the step of adjusting the dynamic threshold according to the at least one condition further comprises:
   adjusting the dynamic threshold according to a number of blank or used blocks within the plurality of blocks.

3. The method of claim 2, wherein the step of adjusting the dynamic threshold according to the at least one condition further comprises:
   adjusting the dynamic threshold according to a ratio of the number of the blank or used blocks to a number of the plurality of blocks.

4. The method of claim 1, wherein the step of adjusting the dynamic threshold according to the at least one condition further comprises:
   adjusting the dynamic threshold according to whether a detected value regarding the controller or Flash memory falls within a specific range of a plurality of ranges.

5. The method of claim 4, wherein the detected value represents a number of blank or used blocks within the plurality of blocks, or represents a ratio of the number of the blank or used blocks to a number of the plurality of blocks.

6. The method of claim 4, wherein the detected value represents a busy or idle level of the controller.

7. The method of claim 4, wherein the at least one condition comprises a first condition of whether the detected value reaches a predetermined threshold; and the step of adjusting the dynamic threshold according to the at least one condition further comprises:
   increasing the dynamic threshold when the detected value reaches the predetermined threshold.

8. The method of claim 7, wherein the step of adjusting the dynamic threshold according to the at least one condition further comprises:
   decreasing the dynamic threshold when the detected value does not reach the predetermined threshold.

9. The method of claim 7, wherein the at least one condition comprises a second condition of whether the detected value is below another predetermined threshold; and the step of adjusting the dynamic threshold according to the at least one condition further comprises:
   decreasing the dynamic threshold when the detected value is below the other predetermined threshold.

10. The method of claim 7, wherein the detected value represents a number of blank blocks within the plurality of blocks.

11. The method of claim 1, wherein the at least one condition comprises a condition of whether an event occurs; and the step of adjusting the dynamic threshold according to the at least one condition further comprises:
    when being triggered by the event, adjusting the dynamic threshold.

12. A memory device, comprising:
    a Flash memory comprising a plurality of blocks; and
    a controller arranged to access the Flash memory and manage the plurality of blocks, wherein the controller adjusts a dynamic threshold according to at least one condition, and compares a valid or invalid page count of a specific block of the plurality of blocks with the dynamic threshold to determine whether to erase the specific block.

13. The memory device of claim 12, wherein the controller adjusts the dynamic threshold according to a number of blank or used blocks within the plurality of blocks.

14. The memory device of claim 13, wherein the controller adjusts the dynamic threshold according to a ratio of the number of the blank or used blocks to a number of the plurality of blocks.

15. The memory device of claim 12, wherein the controller adjusts the dynamic threshold according to whether a detected value regarding the controller or Flash memory falls within a specific range of a plurality of ranges.

16. The memory device of claim 12, wherein the controller adjusts the dynamic threshold according to a number of blank or used blocks within the plurality of blocks.

17. The memory device of claim 12, wherein the at least one condition comprises a condition of whether an event occurs; and when being triggered by the event, the controller adjusts the dynamic threshold.

18. A controller of a memory device, the controller being utilized for accessing a Flash memory comprising a plurality of blocks, the controller comprising:
    a read only memory (ROM) arranged to store a program code; and
    a microprocessor arranged to execute the program code to control access to the Flash memory and manage the plurality of blocks, wherein under control of the microprocessor, the controller adjusts a dynamic threshold according to at least one condition, and compares a valid or invalid page count of a specific block of the plurality of blocks with the dynamic threshold to determine whether to erase the specific block.

19. The controller of claim 18, wherein the controller adjusts the dynamic threshold according to whether a detected value regarding the controller or Flash memory falls within a specific range of a plurality of ranges.

20. The controller of claim 18, wherein the controller adjusts the dynamic threshold according to a number of blank or used blocks within the plurality of blocks.

\* \* \* \* \*